United States Patent
Piekarski et al.

(10) Patent No.: US 9,667,491 B2
(45) Date of Patent: May 30, 2017

(54) DISTRIBUTED CONFIGURATION MANAGEMENT SYSTEM AND METHOD

(71) Applicant: Spectralink Corporation, Boulder, CO (US)

(72) Inventors: Christopher Piekarski, Louisville, CO (US); Fernando Sanchez, Boulder, CO (US)

(73) Assignee: SPECTRALINK CORPORATION, Boulder, CO (US)

( * ) Notice: Subject to any disclaimer, the term of this patent is extended or adjusted under 35 U.S.C. 154(b) by 239 days.

(21) Appl. No.: 14/466,811

(22) Filed: Aug. 22, 2014

(65) Prior Publication Data

US 2016/0057000 A1 Feb. 25, 2016

(51) Int. Cl.
| | |
|---|---|
| *G06F 15/177* | (2006.01) |
| *H04L 12/24* | (2006.01) |
| *H04L 29/08* | (2006.01) |
| *G06F 9/445* | (2006.01) |
| *G06F 9/44* | (2006.01) |

(52) U.S. Cl.
CPC ........ *H04L 41/082* (2013.01); *G06F 9/44505* (2013.01); *H04L 67/34* (2013.01); *G06F 9/4416* (2013.01)

(58) Field of Classification Search
None
See application file for complete search history.

(56) References Cited

U.S. PATENT DOCUMENTS

| | | | |
|---|---|---|---|
| 6,834,301 | B1 | 12/2004 | Hanchett |
| 8,504,809 | B2 * | 8/2013 | Chien ................ H04L 41/0846 709/227 |
| 8,555,273 | B1 | 10/2013 | Chia et al. |
| 8,966,018 | B2 * | 2/2015 | Bugwadia ............ G06F 9/4411 709/220 |
| 2002/0059404 | A1 | 5/2002 | Schaaf et al. |
| 2009/0249215 | A1 | 10/2009 | Paek |
| 2010/0002603 | A1 | 1/2010 | Gupta et al. |
| 2011/0145408 | A1 | 6/2011 | Olsson |
| 2011/0153465 | A1 | 6/2011 | Pombo et al. |
| 2014/0047085 | A1 | 2/2014 | Peters et al. |

OTHER PUBLICATIONS

International Search Report and Written Opinion, PCT/US2015/046243, dated Nov. 13, 2015.

* cited by examiner

*Primary Examiner* — John B Walsh
(74) *Attorney, Agent, or Firm* — Polsinelli PC

(57) ABSTRACT

A configuration management system includes a configuration management application for receiving configuration management information from a user device. The configuration management information including data associated with one or more parameters of the user device to be configured in the user device. The application further, for each parameter, accesses a parameter value associated with the parameter from at least one device configuration file stored in server, and transmits the accessed parameter values to the user device, wherein the parameters of the user device are configured using the parameter values received from the application.

21 Claims, 6 Drawing Sheets

DISTRIBUTED CONFIGURATION MANAGEMENT SYSTEM AND METHOD

TECHNICAL FIELD

Aspects of the present disclosure relate to computer networks and, in particular, to a distributed configuration management system and method.

BACKGROUND

Smart phones, tablets, laptops, and the like are commonplace and people routinely bring these devices to work, school and other environments. Moreover, companies and other entities routinely provide these devices to employees for both business and personal use. Bring your own device (BYOD) is a term generally used to refer to the practice of configuring user devices in a proprietary communication network, such as a Wi-Fi network in an ad hoc manner. Using BYOD, the personal user devices of multiple users may be configured for use in an otherwise proprietary network or computing environment. Additionally, users may have personally owned user devices (e.g., smart phones, tablet computers, personal digital assistants (PDAs), laptop computers, etc.) configured to access otherwise privileged information and/or applications available on the communication network. Mobile Device Management (MDM), which is a particular type of BYOD technology, is implemented using a client-server model in which a client application, executed on each user device, communicates with a server to receive configuration information associated with a particular network. The configuration process may be client initiated or initiated based upon actions of the server.

SUMMARY

According to one aspect of the present disclosure, a configuration management system includes a configuration management application for receiving configuration management information from a user device. The configuration management information including data associated with one or more parameters of the user device to be configured in the user device. The application further, for each parameter, accesses a parameter value associated with the parameter from at least one device configuration file stored in server, and transmits the accessed parameter values to the user device, wherein the parameters of the user device are configured using the parameter values received from the application.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
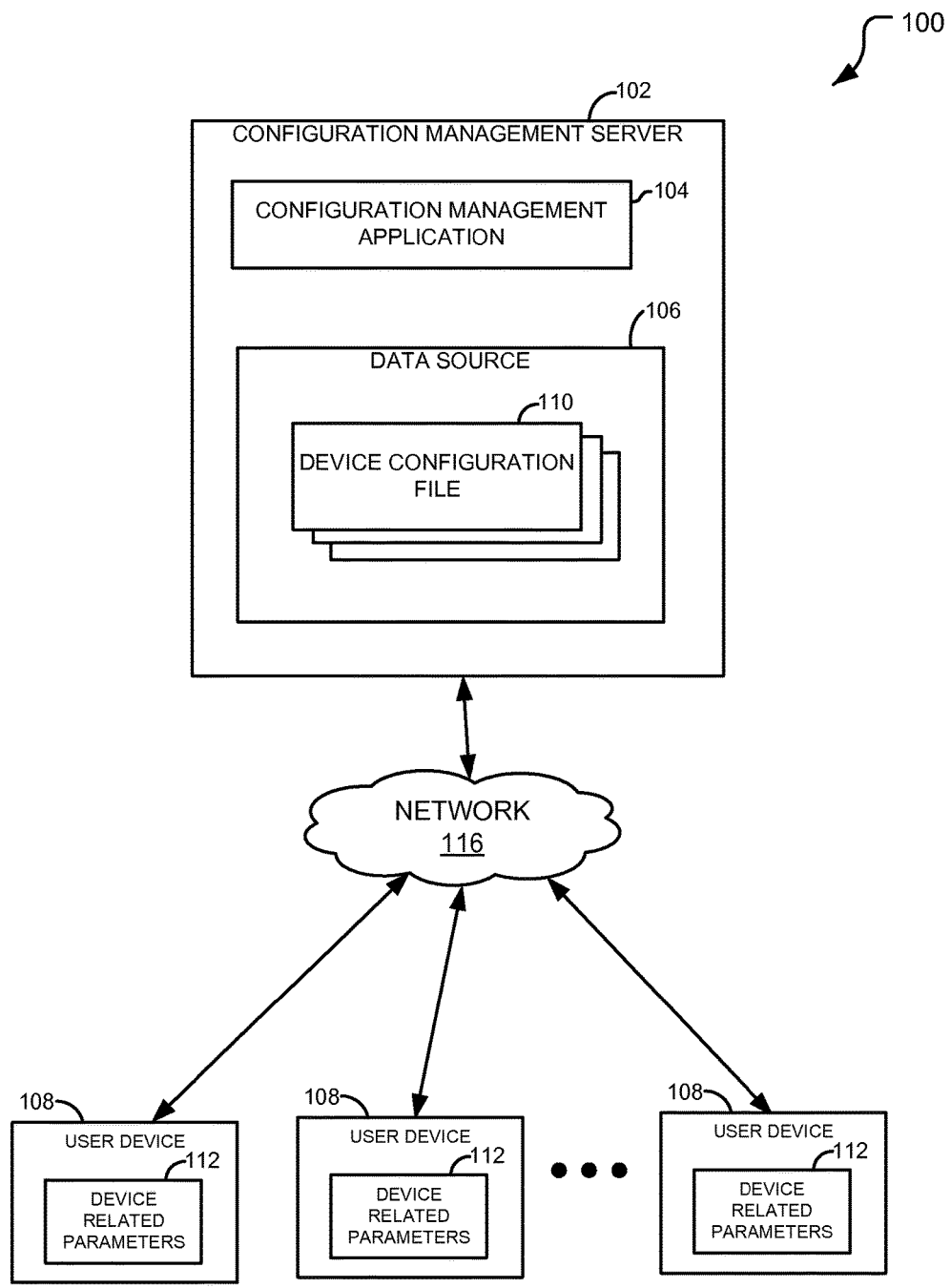
FIG. 1 illustrates an example configuration management system according to one embodiment of the present disclosure.

In traditional network environments, such as a wireless network (e.g., Wi-Fi network) environment, dedicated configuration servers typically coordinate the configuration of the user devices (e.g., clients) in the network, and unilaterally push configuration settings down to each user device. That is, the servers dictate most or all of the configuration settings to be implemented on each user device without regard to any input from the user device. Most of the intelligence is in the server, which is often administered by the system administrator. Each user device may have a limited configuration capability, for example, through menu selections in the user device. Due to variations in the types and capabilities of user devices, system administrators often invest significant time and effort to ensure that each user device remains compatible with the system. Invariably, many of these user devices experience significant down time due to manual configuration, which could result in unduly long delays.

Automatic configuration of user devices using unique information about each device would improve the functionality of wireless networks. The mobile device management (MDM) protocol, which is implemented in a bring your own device (BYOD) environment, has attempted to implement such behavior. Nevertheless, the MDM protocol does not comprehensively cover the milieu of user devices currently in use by users, nor does it provide a sufficiently stable platform for configuration of these devices. MDM was developed for BYOD environments, in which users may have their personal user devices (e.g., smart phones, tablet computers, etc.) configured for use in an otherwise private communication network. With MDM, each user device executes an application (e.g., a mobile app) that functions as a client to the network's MDM server, which issues tasks and pushes configurations to the user device. However, the MDM protocol becomes cumbersome when changes invariably occur to the server and/or user devices, such as due to ongoing software upgrades to the server and/or user devices. In this case, new configurations are often required to be sent to all affected user devices, for example, when an IT department updates its virtual private network (VPN) infrastructure. These global reconfigurations often require substantial user interaction and effort by administrators of the communication network.

Embodiments of the present disclosure provide a solution to these drawbacks, as well as other drawbacks, by implementing an automated user device provisioning system and method that configures user devices in the network using specific configuration information received from each user device, and determines which parameters of that user device are configurable and what values may be applied to each configurable parameter. In this manner, user devices share configuration responsibilities with the servers, thus minimizing administrator intervention by having each user device, itself, indicate which parameters are to be or may be configured. Thus, embodiments of the present disclosure may provide a configuration system in which network enabled user devices may be configured quickly and seamlessly into the network, while ensuring relatively high levels of privacy, security, and/or reliability, among other benefits.

FIG. 1 illustrates an example configuration management system 100 according to the teachings of the present disclosure. The system 100 includes a configuration management server 102 having a configuration management application 104 and a data source 106. The configuration management application 104 communicates with one or more user devices 108 to receive configurable parameter information from one or more device related parameters 112 stored in each respective user device to determine which parameters of that device may be configured by the configuration management application 104. Using this information, the configuration management application 104, for each user device 108, accesses parameter values associated with the received configurable parameters from a device configuration file 110 associated with that user device 108, and transmits the configurable parameter values to each respective user device for configuring the user devices.

Embodiments of the present disclosure provide a dynamic device configuration system that is not limited to operation with only a finite set of user devices as is prevalent today with conventional user device configuration systems used in BYOD environments. For example, because the design and performance characteristics of user devices may vary widely from one another, conventional device configuration systems (e.g., mobile device management (MDM) based systems) are typically limited to operation with only those types of user devices for which specific configuration parameters have been previously vetted or tested for use in that particular communication network. Embodiments of the present disclosure provide a solution to this problem by configuring only those parameters provided to the configuration server by that user device. Additionally, since configuration parameters for each user device is stored in that user device, these configuration parameters may be modified automatically by the user device or manually by a user of the user device to account for occasional, ongoing changes to the user device, such as due to software upgrades to the user device, installation/removal of software applications, and/or installation/removal of hardware devices from the user device.

Generally, the device related parameters 112 stored in each user device 108 indicates which parameters of the device 108 may be configured (e.g., manipulated) by the application 104. Thus, the configuration of each user device 108 may be individually controlled such that the components and/or executable programs of that user device 108 are compatible with the BYOD system. The configurable parameter information may be transmitted to the application 104 in response to manual intervention by the user of the user device 108 and/or in response to a request for the configurable parameter information from the application 104. The configurable parameters include any type of information for controlling the user device 108, physical components of the user device, and/or applications executed on the user device. For example, the configurable parameters may include information associated with a global positioning system (GPS) mapping software application stored, and executed on the user device such that a certain subset of waypoints are allocated for access and/or use within the BYOD network, while another subset of private waypoints are inhibited from access and/or use by the BYOD network. As another example, configurable parameters may include information associated with a software version of the operating system and/or software versions of one or more applications installed on the user device 108 such that, when accessed, the application 104 accesses parameter values that are compatible with the version of software installed on the user device.

Each device configuration file 110 includes parameter values uniquely associated with each user device 108. The parameter values stored in each device configuration file 110 is determined according to various factors, including the configuration information received from its respective user device 108, characteristics of the applications and/or services provided by the BYOD network, and customized settings determined by administrators of the BYOD network. For example, the device configuration file 110 for a particular user device 108 may store information associated with a maximum throughput communication rate of that user device as a default parameter value. Nevertheless, the maximum throughput communication rate parameter value stored in the device configuration file 110 may be modified by administrators of the BYOD network to limit (e.g., throttle) the communication speed of that user device 108 as the needs and capabilities of the network changes over time.

The configuration management server 102 may be configured in any suitable type of communication network, such as one in which users may have their personal user devices or other user devices configured to access otherwise privileged information and/or applications available to only those devices that are available through the communication network. In one embodiment, the communication network is a packet-based network, such as a Wi-Fi network that encompasses a specified geographical region from which user devices may be configured in an ad hoc manner. For example, the communication network may comprise a virtual private network (VPN) owned and managed by a brick-and-mortar based retailer in which employees of that retailer may have their personal user devices configured to access information and/or applications associated with the operation of that retailer's business objectives. Examples of user devices that may be configured for use with the network include smart phones, tablet computers, personal digital assistants (PDAs), laptop computers, and the like. In a particular example, the user devices are computing devices (e.g., smartphones, tablet computers, etc.) executing an operating system environment (e.g., ANDROID™ operating system) that communicate with Wi-Fi based networks.

The configuration management application 104 and the user devices 108 communicate with one another using a communications network 116, such as the Internet, an intranet, or another wired and/or wireless communication network. Nevertheless, the server 102 and the user devices 108 may communicate with one another in any suitable manner. For example, the server 102 and the user devices 108 may communicate with each other using wireless and/or wired communications. In one embodiment, the server 102 and user devices 108 communicate with one another using any suitable protocol or messaging scheme. For example, they may communicate using a Hypertext Transfer Protocol (HTTP), extensible markup language (XML), extensible hypertext markup language (XHTML), a hypertext transfer protocol secure (HTTPS), or a Wireless Application Protocol (WAP) protocol. Other examples of communication protocols exist. For example, the server 102 and user devices 108 may communicate with one another without the use of a separate and a distinct network.

Figure 2:
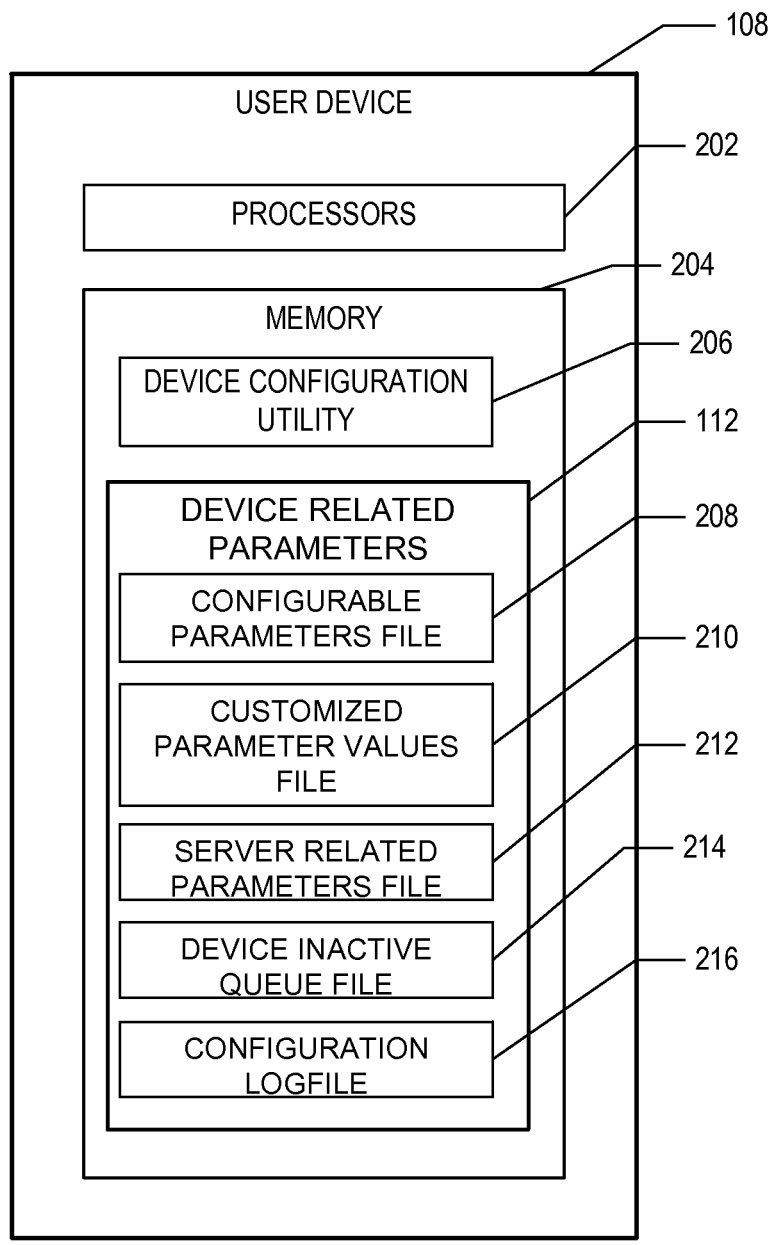
FIG. 2 illustrates an example user device that may be configured by the configuration management system according to one embodiment of the present disclosure.

FIG. 2 illustrates an example user device 108 according to one aspect of the distributed configuration management system 100. The user device 108 is a computing or processing device that includes one or more processors 202 and a memory 204. The memory 204 stores a device configuration utility 206 that functions with the configuration management application 104 for configuring its respective user device 108. In one embodiment, the device configuration utility 206 comprises a mobile application (i.e., app) executed on a mobile based operating system platform, such as the ANDROID™ operating system.

The device configuration utility 206 may be initiated upon request from the user of the user device, or may function as a background task that executes at recurring intervals (e.g., periodic intervals) to update its parameters for use in the network. Essentially, the user device tells the server what parameters can be configured on itself. In a manner of speaking, each device is in regular communication with the configuration server(s) at recurring intervals using recurring heartbeat messages to ensure that the network remains stable, particularly when user devices change (e.g., software upgrades) or when new user devices are added to the network. Network stability, in this context, means that applications and/or services provided by the BYOD network for each user device 108 are provided in a consistent, organized manner and/or that interaction with each user device 108 does not cause disruption to the BYOD network or to other user devices 108 who may use the network.

The memory 204 also stores a configurable parameters file 208, a customized parameters file 210, a server related parameters file 212, a configuration log file 214, and an inactive state queuing file 216. Although the configurable parameters file 208, customized parameters file 210, server related parameters file 212, configuration log file 214, and inactive state queuing file 216 are described herein as files, it should be understood that information associated with each of these files may also be stored in multiple files, one or more database records, or other type of computer-based storage medium. The configurable parameters file 208 stores information associated with parameters that are allowed to be configured on the user device, while the customized parameters file 210 stores information about special settings to be applied to one or more of the allowed parameters. The purpose of the server related parameters file 212 and configuration log file 214 will be described in detail herein below.

Figure 3:
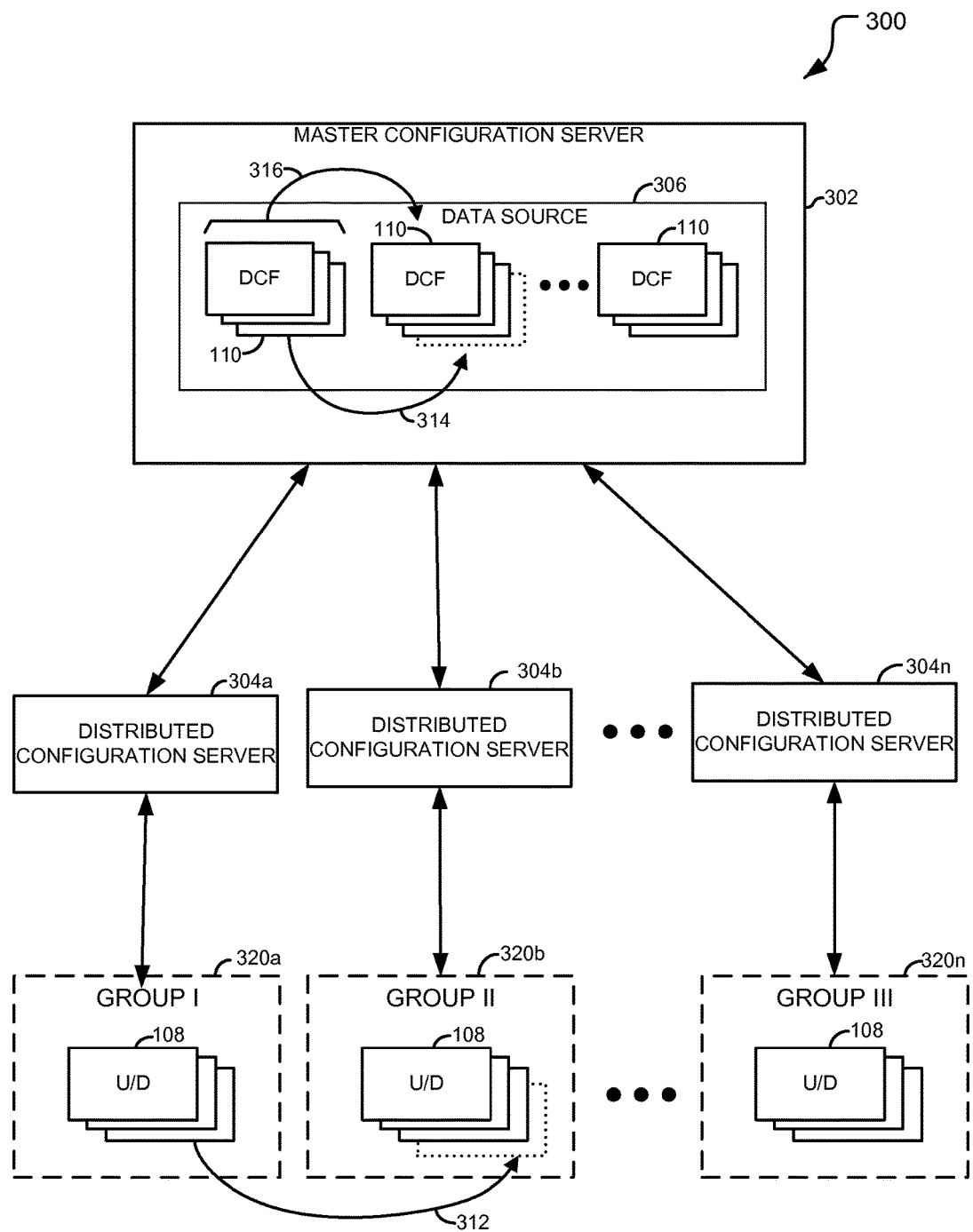
FIG. 3 illustrates an example distributed configuration management system according to one embodiment of the present disclosure.

FIG. 3 illustrates another example distributed configuration management system 300 according to the teachings of the present disclosure. The system 300 includes multiple servers comprising a master configuration server 302 and one or more distributed configuration servers 304a, 304b, and 304n that collectively function in a manner similar to the server 102 of FIG. 1 to configure user devices 108 for use in the communication network. Additionally, the system 300 is configured to organize user devices 108 in groups for reasons which will be described in detail herein below.

The multiple distributed configuration servers 304a, 304b, and 304n are provided for configuring user devices under control of the master configuration server 302. For example, the distributed configuration servers 304a, 304b, and 304n may be dispersed in differing geographic regions for configuration of those user devices 108 in their respective geographic regions. The master configuration server 302 may communicate with each distributed configuration server 304a, 304b, and 304n to maintain an up-to-date record for each user device 108 configured in the network. Thus, the master configuration server 302 coordinates the operation of one or more distributed configuration servers 304a, 304b, and 304n using a distributed architecture that could be particularly useful for large enterprise deployments.

The master configuration server 302 includes a data source 306 that stores device configuration files (DCF) 110 received from each distributed configuration server 304a, 304b, and 304n such that configuration of user devices may be consistently maintained across the communication network. For example, if a user physically moves 312 from a first location administered by a first distributed configuration server 304a to a second location administered by a second distributed configuration server 304b, the second distributed configuration server 304b upon initial communication with the user device 108, may access 314 a device configuration file 110 uniquely associated with that user device 108 from the master configuration server 302 and continue configuration with that user device 110 in the normal manner.

Additionally network reliability may be enhanced by providing for failover of user devices to other distributed configuration servers in the event that the primary distributed configuration server fails. For example, the configuration information for each user device 108 originally administered by server 304a may be migrated 316 to another distributed configuration server 304b in the event that a primary distributed configuration server 304a administering the configuration of the user device 108 goes offline due to various reasons, such as a failure of the server, or periodic maintenance conducted on the server.

The communications among the user devices 108, distributed configuration server 304a, 304b, and 304n, and master configuration server 302 may be encrypted for enhanced security. For example, the distributed configuration server 304a, 304b, and 304n may restrict access to the communication network by ensuring media access control (MAC) addresses included in messages received from user devices 108 are valid. As another example, network communications (e.g., over-the-air Wi-Fi communications) between the user devices 108 and distributed configuration servers 304a, 304b, and 304n would be handled using a hypertext transfer protocol secure (HTTPS) protocol.

According to one embodiment, the application 104 may organize each user device 108 in one or more groups 320a, 320b, and 320n. A large retailer having multiple geographically dispersed retail stores, for example, could have a distributed configuration server 304a, 304b, and 304n in each of its individual stores with site-wide settings for each store, while managing the configuration parameters for specific groups within a store and for each user device. As shown, the user devices 108 operate in a nested environment by organizing each user device 110 in one or more groups 320a, 320b, and 320n. For example, the communication network 300 may be adapted for use in a hospital in which one group could include the user devices 108 of the nurses employed by that hospital, another group could include the user devices 108 of the doctors of the hospital, and another group could include the user devices 108 of maintenance personnel employed by that hospital. As another example, the communication network 300 may be adapted for use in a warehouse retailer in which one group includes the user devices 108 of a plumbing section of the warehouse retailer while another group includes the user devices 108 of an electrical section of the warehouse retailer.

The application 104 stores group information in the device configuration file 110 associated with each user device 108. For example, user devices may be allocated to use differing portions of a database according to the group in which they are organized. Thus, the application 104 may store database access rights in the device configuration file 110 according to the group to which each user device 108 belongs to. The application 104 may further use this information for determining what configuration information to be transmitted to each user device 108 such that each user device is configured to access only its designated portion of the database.

Figure 4:
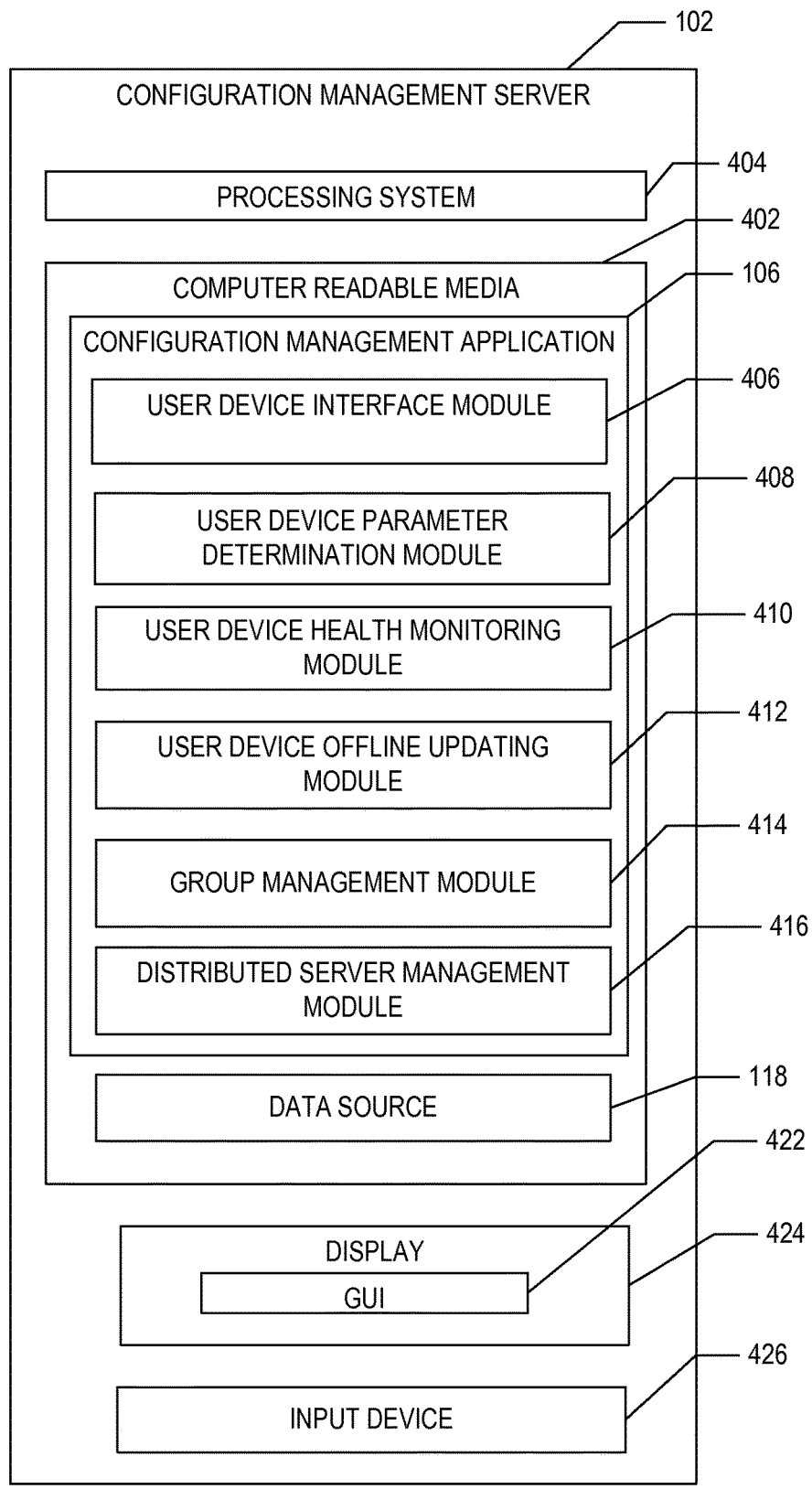
FIG. 4 illustrates a block diagram of an example configuration management application executed on the distributed configuration management server according to one embodiment of the present disclosure.

Referring now in more detail to FIG. 4, a block diagram of an example configuration management application 104 executed on the configuration management server 102, is depicted according to one aspect of the present disclosure. The configuration management application 104 is stored in a computer readable media 402 and executed on a processing system 404 of the management server 102. The management server 102 may include any type of computing system, such as one or more management servers, personal computers, mobile computers and/or other mobile devices.

According to one aspect, the configuration management server 102 also includes a graphical user interface (GUI) 422 displayed on a display 424, such as a computer monitor, for displaying data. The distributed configuration management server 102 also includes an input device 426, such as a keyboard or a pointing device (e.g., a mouse, trackball, pen, or touch screen) to enter data into or interact with the GUI 422. According to one aspect, the configuration management application 104 includes instructions or modules that are executable by the processing system 402 as will be described in detail herein below.

The computer readable media 402 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user device interface module 406 facilitates the receipt of input data and/or output data from or to a user device, respectively. In one example, the user device interface module 406 receives messages from each user device that includes configuration information associated with that user device, and transmits configuration parameter values determined by the configuration management application for that user device.

A user device parameter value determination module 408 determines parameter values for each configurable parameter received from the user device. In one embodiment, the user device parameter value determination module 408 determines the parameter values by accessing the parameter values stored in a device configuration file 110 uniquely associated with that user device. The parameter values may include default values associated with that user device, and may be manually modified by an administrator using the GUI 422 and input device 426 to override the default settings. In another embodiment, the user device parameter value determination module 408 determines one or more parameter values from customized parameter values received from the user device. For example, a user of a particular user device may desire to have an application display textual content in a larger font size other than what is displayed by default in the application. Thus, the user may set a customized parameter value instructing the user device parameter value determination module 408 to configure the user device to display textual content at the customized font size value selected by the user.

In one embodiment, the user device parameter value determination module 408 determines parameter values for each configurable parameter according to multiple hierarchal priority levels. For example, a first hierarchal priority level may include an enterprise level in which the user device parameter value determination module 408 specifies parameter values for every user device on the system. A second hierarchal priority level includes a group level in which the user device parameter value determination module 408 specifies parameter values for those user devices organized in a group such as is described below with reference to the group management module 414. A third hierarchal priority level includes a device level in which the user device parameter value determination module 408 specifies parameters on a device-by-device basis (e.g., according to the customized parameters obtained from the customized parameter values file 210 stored in each user device).

The user device parameter value determination module 408 provides ascending priority for parameter values included in each of the first, second, and third priority levels. That is, parameter values in the second priority level (e.g., group level) may override the parameter values set in the first priority level (e.g., enterprise level), while parameter values in the third priority level (e.g., user device level) may override the parameter values set in the first and second priority levels. For example, a default system wide parameter level, such as an audio volume level, to a default value of '3' such that all user devices in the system may be set to this level. Nevertheless, if a group level specifies the audio volume level to be '5', the user device parameter value determination module 408 will override the default setting of '3' and set all user devices that are a member of that group to the parameter level of '5'. Moreover, if the customized parameter values file 212 specifies the audio volume level to be '8', the user device parameter value determination module 408 override the default setting and the group setting and set that user device to have an audio volume level of '8'.

A user device health monitoring module 410 monitors one or more operating characteristics of each user device and stores the operating characteristics in a device configuration file 110 uniquely associated with each user device. For example, the health monitoring 410 receives information about each user device, such as battery life, signal strength and other network information, and store this information in the device configuration file 110 to maintain information about the overall health of the user device and for generating log files for analysis by administrators at a later time. As another example, the health monitoring module 410 may store information associated with any security faults (e.g., failed login attempts, inappropriate file access, etc.) that may be detected by that user device such that administrators may be able to determine the time and frequency of the security faults to determine whether a network attack may be originating from any specific user device in the network.

A user device offline updating module 412 manages the configuration for user devices when they go offline (e.g., are not in active communication) from the network. For example, the updating module 412 continually monitors each heartbeat message that is received from the user devices, and sets the status of those user devices whose heartbeat message is not received at a specified period of time to an offline status. When a user device goes offline, the updating module 412 stores all changes to the configuration of the offline user device such that, when communication with the user device is re-established, the updating module 412 may push down the changed configuration to the user device. For example, while a user device is offline, the configuration of the offline user device is modified to reflect a software upgrade to an application that is executed on that user device. When the user device again goes online, the updating module 412 transmits the modified configuration comprising the software upgrade to the user device.

A group management module 414 manages the organization of one or more user devices configured in a group. The group management module 414 may store and manipulate group information in the device configuration file associated with each user device. For example, when a new user device is added to a group, the group management module 414 modifies the device configuration file associated with that user device to indicate that the user device is now a member of that group. Also, when certain parameters of a group are changed, the group management module 414 modifies the device configuration files associated with all user devices organized in that group. For example, when a group of user devices is modified to provide expanded file access privileges to files not heretofore available to user devices of that group, the group management module 414 accesses and stores information associated with this expanded file access capability for each device configuration file associated with each user device of the group.

A distributed server management module 416 manages the operation of multiple configuration servers configured to provide configuration management of user devices in the communication network. For example, if the configuration management application 104 is configured for use as a master configuration server 302, the distributed server management module 416 may communicate with other distributed configuration servers 304 to receive device configuration files from each for storage within its own memory. Alternatively, when the configuration management application 104 is configured for use as a distributed configuration server 304, the distributed server management module 416 may perform configuration management for user devices as described above with reference to the server 102 of FIG. 1, and communicate with the master configuration server 320 for uploading (e.g., transmitting) device configuration files 110 for each user device whose configuration that is administers. In one embodiment, the distributed server management module 416 uploads device configuration files to the master configuration server 302 whenever a change to that device configuration file changes. In another embodiment, the distributed server management module 416 uploads device configuration files to the master configuration server 302 on an ongoing, periodic basis (e.g., once every 30 to 60 minutes).

It should be appreciated that the modules described herein are provided only as examples, and that the configuration management application 104 may have different modules, additional modules, or fewer modules than those described herein. For example, one or more modules as described in FIG. 4 may be combined into a single module. As another example, certain modules described herein may be encoded on, and executed on other computing systems, such as on the user devices.

Figure 5:
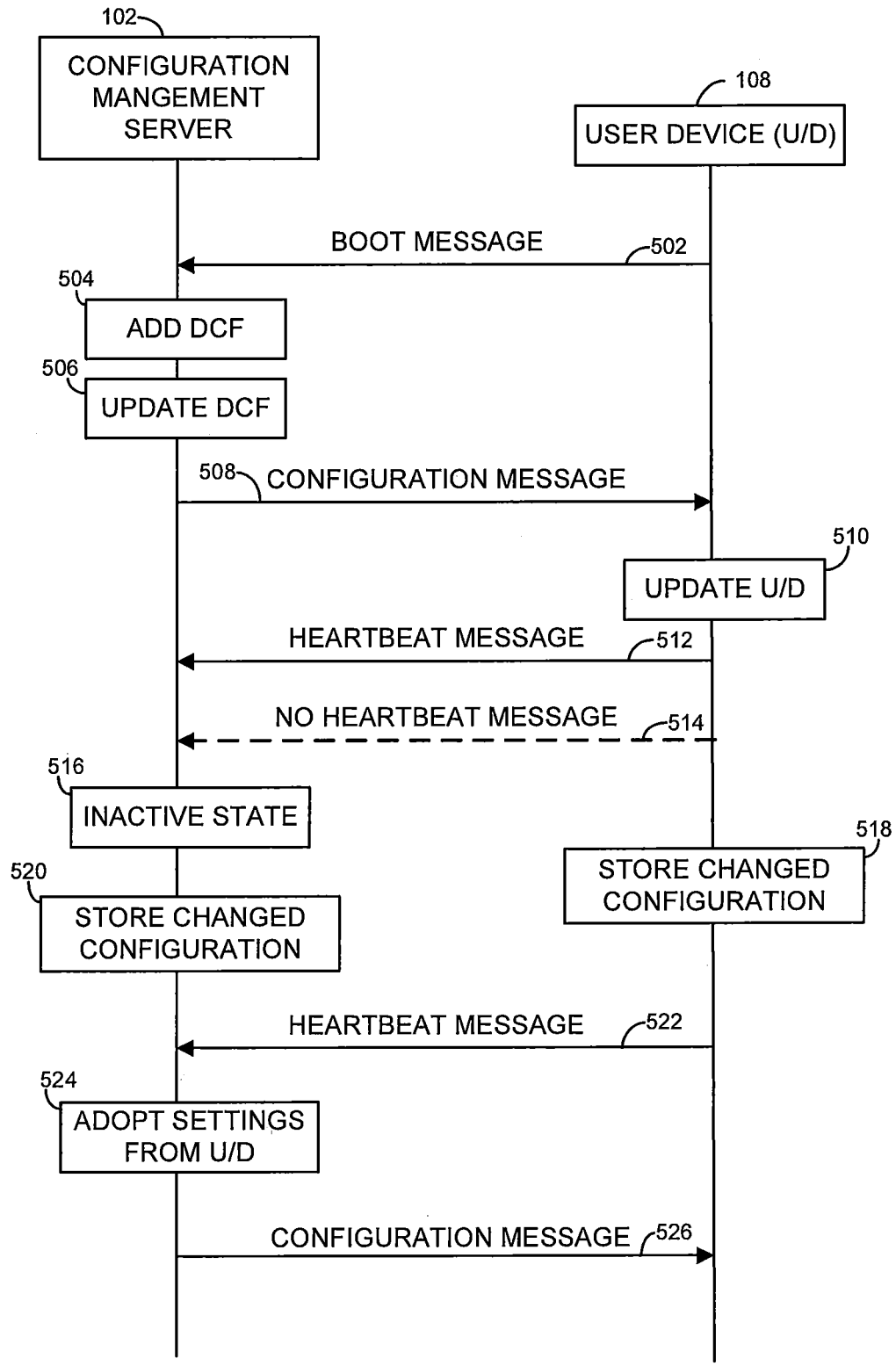
FIG. 5 illustrates an example flow diagram that may be performed by the configuration management application according to one embodiment of the present disclosure.

FIG. 5 illustrates an example call flow diagram showing how a user device (U/D) 108 may be configured for use in the network using the configuration management server. Initially, the user device has not been previously configured by the configuration management server. For example, the user device may be a new device recently purchased by its user. As another example, the user device may be a device of a user who has recently been admitted to an organization that administers the BYOD network, such as a new employee at a retail establishment that administers the BYOD network.

The device configuration utility 206 transmits a boot message to the application 104 when the presence of its server 102 is detected (step 502). For example, the device configuration utility 206 may transmit the boot message when it detects a broadcasted device discovery message periodically transmitted from the application 104. The boot message includes any information that allows the server 102 to uniquely identify that user device 108 from among the other user devices 108 that may be configured in the system. In one embodiment, the message includes the MAC address, current firmware, version, model number, a timestamp, and/or any other information needed to allow the server to uniquely identify the user device. In one specific embodiment, the boot message also includes the configurable parameters of the user device along with any customized parameter values to be used by the server for configuring that user device 108. In other embodiments, the configurable parameters and customized parameter values may be uploaded to the server in one or more other messages separate from the boot message.

If the user device has not been previously configured, a device configuration file (DCF) 110 uniquely associated with that user device 108 is generated (step 504). However, if the user device has already been configured, the application 104 will use information from the boot message to update the device's configuration file associated with that user device 108 (step 506).

The server 102 pushes the configuration parameters down to the utility 206 (step 508), and in response, the utility 206 updates the configuration of its user device 108 using the received configuration parameters (step 510). The configuration parameters can be received in a single message, or they can be received in multiple messages.

The utility 206 transmits recurring (e.g., periodic) heartbeat messages to the application 104 (step 512). Generally speaking, an ongoing dialog between the utility 206 and application 104 is maintained by the heartbeat messages. The utility 206 sends out heartbeat messages to the application 104 on an ongoing (e.g., periodic) basis. The frequency of the heartbeat message is a configurable parameter, but may be approximately once every minute. As the application 104 receives heartbeat messages from the utility 206 of each user device, it tracks whether or not that user device is active in the communication network. In one embodiment, each heartbeat message may include one or more operating characteristics about the user device, such as a battery condition of the user device, a received signal strength measured by the user device, and/or other network-based information. The application 104 may use this information to maintain information about the overall performance characteristics of the user device and for updating the configuration log file 216 associated with that user device 108 for analysis by administrators at a later time.

In the event that the application 104 ceases receiving heartbeat messages, such as when the application 104 ceases to transmit the heartbeat messages (e.g., when the user device is turned off), or by failure of the application 104 to properly receive the heartbeat messages (e.g., when the user device is out of range of the server) (step 514), the application 104 changes the operational state of the user device to an inactive state (step 516). That is, the protocol between the application 104 and the utility 206 does not extend only to normal operation when the application 104 and utility 206 are actively communicating with one another (e.g., active state), but also when the application 104 and utility 206 are not actively communicating (e.g., inactive state). For example, if a user device goes to an inactive state, and a particular parameter is changed on either of the server or user device to a differing value, the discrepancy may be resolved once the user device goes to the active state (e.g., reconnect event between the application 104 and the utility 206).

Specifically, when no heartbeat message is received by the application 104, the utility 206 stores configuration parameters that are changed on the user device during the inactive state in the inactive queue file 214 (step 518). Likewise, the application 104 stores configuration parameters related to that utility 206 in the device configuration file associated with that user device (step 520). Once the utility 206 reconnects to the network (step 522), the utility 206 notifies the application 104 that a newer configuration is available, and pushes the configuration associated with its user device, which includes information stored in the inactive queue file 214. The utility 206 pushes the configuration information at any suitable time, typically prior to the next heartbeat message. The application 104 compares the changes, adopts the user device's settings into the version of the configuration for that user device (step 524).

Thereafter, the application 104 pushes down the complete configuration to the user device, if any configuration values have changed (step 526).

The previous steps may be repeatedly performed for other user devices that may be configured for use with the communication network. Nevertheless, when use of the configuration management application 104 is no longer needed or desired, the process ends.

Although FIG. 5 describes one example of a process that may be performed by the configuration management application 104, the features of the disclosed process may be embodied in other specific forms without deviating from the spirit and scope of the present disclosure. For example, the configuration management application 104 and/or device configuration utility 206 may perform additional, fewer, or different operations than those operations as described in the present example. As another example, one or more of the steps of the process described herein may be performed by another computing system other than the computing system 102, which may be, for example, another application or service executed on the user device that is to be configured for use in the communication network.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
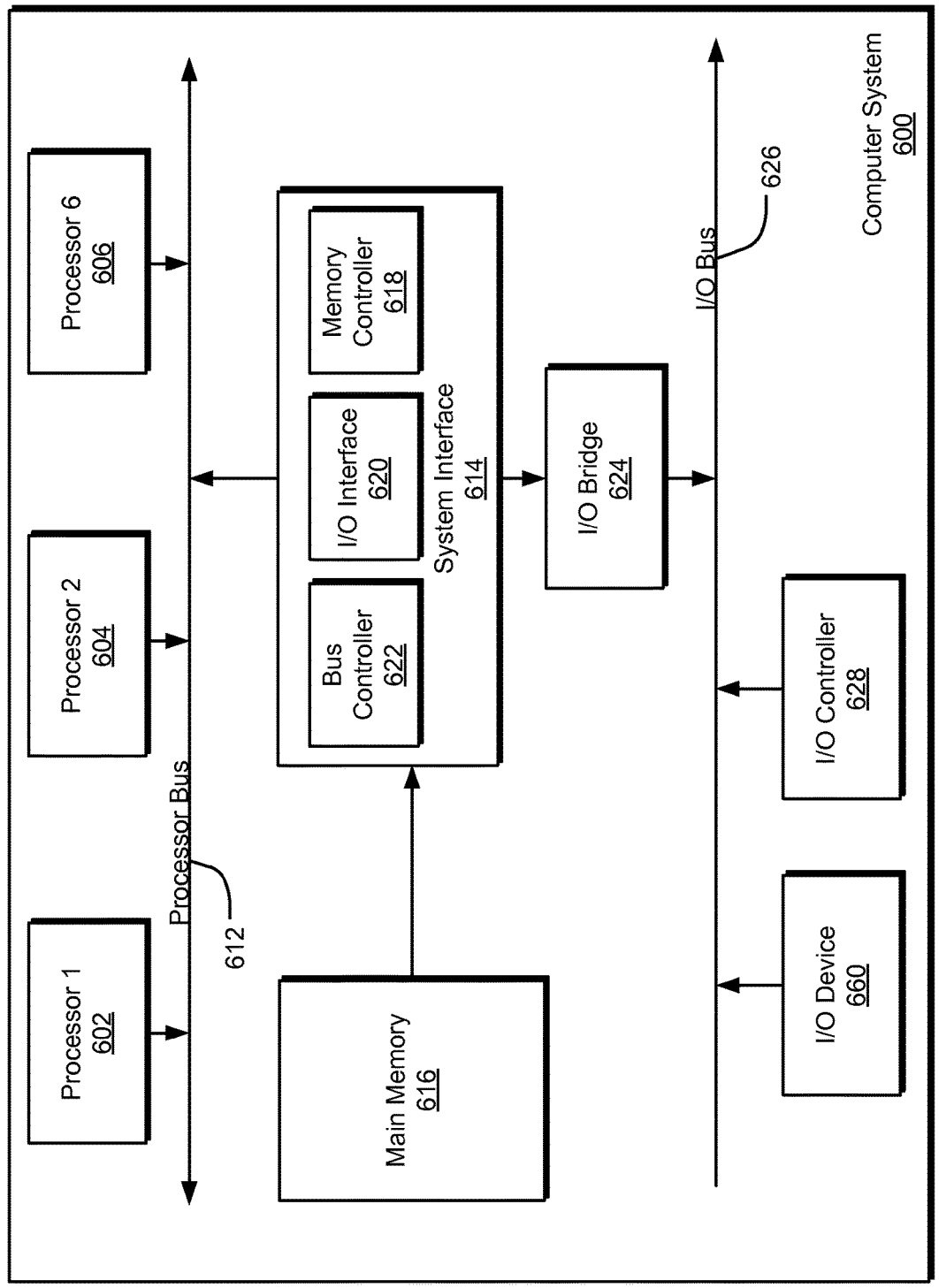
FIG. 6 illustrates an example process that is performed by the configuration management application to manage the storage and retrieval of data in a distributed storage system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A distributed configuration management system comprising:
   a configuration management server comprising at least one processor and at least one memory to store a configuration management application that is executed by the at least one processor to, for each of a plurality of user devices:
      receive, from a user device, a request to access information or an application from a privileged communication network each time the information or the application is accessed, the request including configuration management information from the user device, the configuration management information including data associated with one or more parameters of the user device to be configured;
      for each parameter, access a parameter value associated with the parameter from at least one device configuration file stored in the at least one memory; and
      transmit the accessed parameter values to the user device,
      wherein the parameters of the user device are configured using the parameter values received from the application, and
      wherein the user device is executed to access the information or the application using the configured parameters of the user device.

2. The distributed configuration management system of claim 1, wherein the configuration management application is restricted from transmitting, to the user device, any parameter values not included in the configuration management information.

3. The distributed configuration management system of claim 1, wherein the configuration management information includes data associated with one or more customized values for a corresponding one or more of the parameters of the user device, the configuration management application accessing the one or more parameters from the data source according to the received customized values.

4. The distributed configuration management system of claim 1, wherein the application is further executed by the at least one processor to:
   initially receive a boot message from the user device, the boot message comprising user device information to uniquely identify that user device from among the other user devices;
   store the user device information and the accessed parameter values associated with that user device in the memory;
   receive one or more recurring configuration request messages from the user device; and
   in response to receipt of each recurring configuration request message, determine whether any of the parameter values associated with the user device that are stored in the data source have changed; and
   transmit the changed parameter values to the user device, wherein the parameters of the user device associated with the changed parameter values are configured in the user device.

5. The distributed configuration management system of claim 1, wherein the configuration management application is further executed by the at least one processor to:
   receive recurring configuration request messages from each user device at periodic intervals;
   when the recurring configuration request message is not received at an expected time interval:
      determine whether any of the parameters associated with the user device which are stored in the data source have changed; and
      store those parameters associated with the user device that have changed in a changed log file; and
   when another recurring configuration request message is received from the user device at a later time, transmit the parameters stored in the changed log file to the user device.

6. The distributed configuration management system of claim 1, further comprising a plurality of the device configuration files stored in the memory, each device configuration file associated with one of a plurality of groups of user devices, the application being further executed to:

identify which one of the plurality of groups that the user device is associated with; and access the parameter values for that user device from the device configuration file associated with that group.

7. The distributed configuration management system of claim 1, wherein the application is further executed to:

override one or more system wide parameter values with the parameter values specified in the device configuration file associated with the group; and override one or more of the parameter values specified in the device configuration file associated with the group with a corresponding one or more customized values obtained from each user device.

8. The distributed configuration management system of claim 1, wherein the configuration management server comprises a master configuration server and one or more distributed configuration servers configured to communicate with the master configuration server, the configuration management application of the master configuration server executed to:

receive the configuration management information from each distributed configuration management server on a recurring basis; and store the received configuration management information in the plurality of device configuration files.

9. The distributed configuration management system of claim 8, wherein the configuration management application of the master configuration server is executed to:

when the configuration management application of a first distributed configuration server that administers at least one user device fails, transfer at least one device configuration file associated with the at least one user device to the configuration management application of a second distributed configuration server, wherein the configuration management application of the second distributed configuration server commences administration of the at least one user device.

10. The distributed configuration management system of claim 8, wherein the master configuration server is executed to:

when one user device is moved from a first region administered by a first distributed configuration server to a second region administered by a second configuration server, transfer the device configuration file associated with the one user device to the configuration management application of the second distributed configuration server, wherein the configuration management application of the second distributed configuration server commences administration of the at least one user device.

11. The distributed configuration management system of claim 8, wherein the user device communicates with the configuration management server using a secure HTTPS connection.

12. A distributed configuration management method comprising:

receive, using an configuration management application stored on a non-transitory medium and executed on at least one processor, from a user device, a request to access information or an application from a privileged communication network each time the information or the application is accessed, the request including configuration management information associated with one or more parameters of the user device to be configured;

for each parameter, access, using the application, a parameter value associated with the parameter from at least one device configuration file stored in the at least one memory for each parameter; and transmit, using the application, the accessed parameter values to the user device, wherein the parameters of the user device are configured using the parameter values received from the application, and wherein the user device is executed to access the information or the application using the configured parameters of the user device.

13. The distributed configuration management method of claim 12, further comprising restricting, using the application, transmitting any parameter values not included in the configuration management information to the user device.

14. The distributed configuration management method of claim 12, further comprising accessing the one or more parameter values from the data source according one or more customized values received from the user device.

15. The distributed configuration management method of claim 12, further comprising:

initially receiving a boot message from the user device, the boot message comprising user device information to uniquely identify that user device from among the other user devices; and storing the user device information and the accessed parameter values associated with that user device in the memory;

receiving one or more recurring configuration request messages from the user device; and in response to receipt of each recurring configuration request message, determining whether any of the parameter values associated with the user device that are stored in the data source have changed;

transmitting the changed parameter values to the user device; and configuring the parameters of the user device associated with the changed parameter values in the user device.

16. The distributed configuration management method of claim 12, further comprising:

receiving recurring configuration request messages from each user device at periodic intervals;

when the recurring configuration request message is not received at an expected time interval:

determining whether any of the parameters associated with the user device which are stored in the data source have changed; and storing those parameters associated with the user device that have changed in a changed log file; and when another recurring configuration request message is received from the user device at a later time, transmitting the parameters stored in the changed log file to the user device.

17. A distributed configuration management system comprising:

a user device comprising at least one processor and at least one memory to store a device configuration utility that is executed by the at least one processor to:

transmit a request to a configuration management server, the request including configuration management information associated with one or more parameters of the user device to be configured, the configuration management server accessing, for each parameter, a parameter value associated with the parameter from at least one device configuration file stored in a memory of the configuration management server;

receive the accessed parameter values to the user device; and configure the user device using the parameter values received from the configuration management server, and executing the user device to access the information or the application using the configured parameters of the user device.

18. The distributed configuration management system of claim 17, wherein the configuration management information includes data associated with one or more customized values for a corresponding one or more of the parameters of the user device, the configuration management server accessing the one or more parameter values from the data source according to the received customized values.

19. The distributed configuration management system of claim 17, wherein the utility is further executed by the at least one processor to:

initially transmit a boot message to the server, the boot message comprising user device information to uniquely identify that user device from among other user devices, the server storing the user device information and the accessed parameter values associated with that user device in a memory of the server;

transmitting one or more recurring configuration request messages to the server, the server determining whether any of the parameter values associated with the user device that are stored in the data source have changed, and transmitting the changed parameter values to the user device; and configuring the changed parameter values in the user device.

20. The distributed configuration management system of claim 17, wherein the utility is further executed by the at least one processor to:

transmit recurring configuration request messages from each user device at periodic intervals;

when communication with the server fails:

determine whether any of the parameters associated with the user device have changed;

store those parameters associated with the user device that have changed; and when communication with the server commences, transmit the stored parameter values to the server, the server updating the configuration information.

21. The distributed configuration management system of claim 17, wherein the user device is organized in a group including other user devices, when the configuration management information is transmitted to the server, the server identifying which one of the plurality of groups that the user device is associated with, and accessing the parameter values for that user device from the device configuration file associated with that group.

* * * * *